Figure 2:
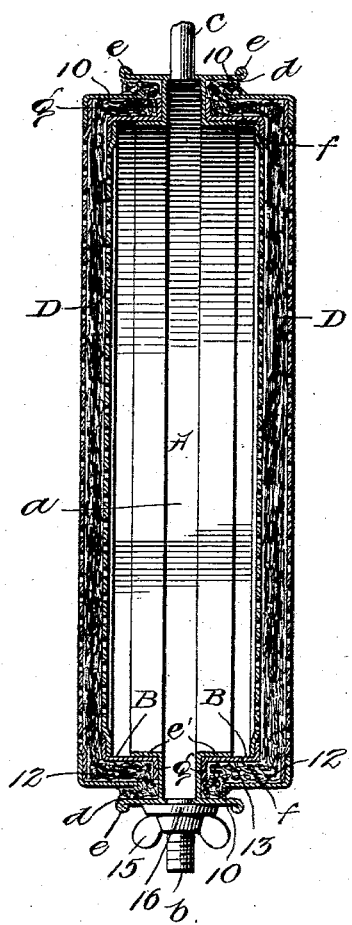

No. 740,365. PATENTED SEPT. 29, 1903.
E. M. KNIGHT.
FILTER.
APPLICATION FILED MAR. 4, 1903.
NO MODEL. 2 SHEETS—SHEET 1.
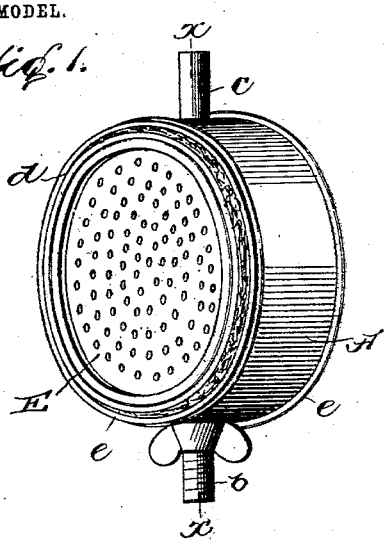
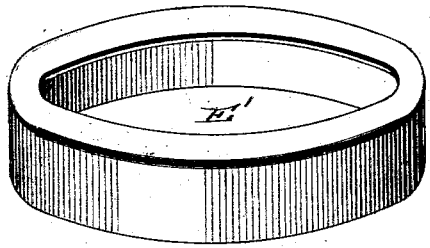
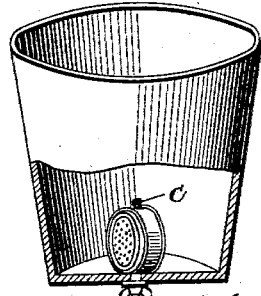
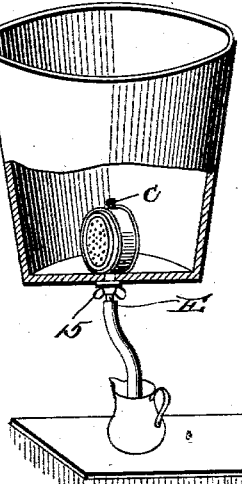
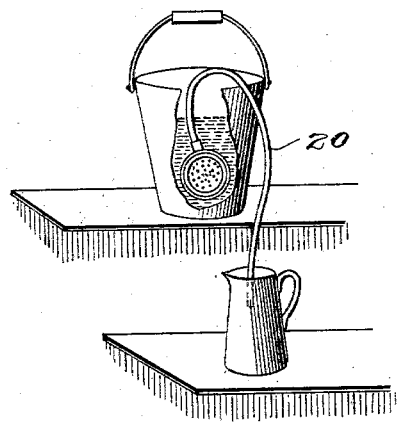
Witnesses
T. L. Mocksom
Chapman W. Fowler
Inventor
Edward M. Knight
by T. Walter Fowler
his Attorney No. 740,365. PATENTED SEPT. 29, 1903.
E. M. KNIGHT.
FILTER.
APPLICATION FILED MAR. 4, 1903.
NO MODEL. 2 SHEETS—SHEET 2.

Witnesses
J. L. Mochan
Chapman W. Fowler

Inventor
Edward M. Knight
by T. Walter Fowler
his Attorney

No. 740,365.

Patented September 29, 1903.

UNITED STATES PATENT OFFICE.

EDWARD M. KNIGHT, OF BROOKLYN, NEW YORK, ASSIGNOR OF ONE-HALF TO R. H. MARTIN, OF NEW YORK, N. Y.

FILTER.

SPECIFICATION forming part of Letters Patent No. 740,365, dated September 29, 1903.

Application filed March 4, 1903. Serial No. 146,121. (No model.)

*To all whom it may concern:*

Be it known that I, EDWARD M. KNIGHT, a citizen of the United States, residing at Brooklyn, in the county of Kings and State of New York, have invented new and useful Improvements in Filters, of which the following is a specification.

This invention relates to certain new and useful improvements in filters designed particularly for domestic purposes for removing sedimentary matter from water; and the invention consists of the parts and the constructions and combinations of parts which I will hereinafter describe and claim.

In the accompanying drawings, forming part of this specification, and in which similar letters of reference indicate corresponding parts throughout the several views, Figure 1 represents a perspective view of a filter constructed according to my invention. Fig. 2 is an enlarged sectional view of the same on the line $x\ x$ of Fig. 1. Fig. 3 illustrates a modification to be referred to. Figs. 4, 5, and 6 illustrate several uses of the filter.

In carrying out my invention I prefer to construct the filter in the form of a relatively narrow disk, as such form is well adapted for the several uses to which my filter is intended to be put.

The central member A of the filter constitutes, substantially, an open-center frame, and it is made of suitable material and sufficiently rigid to insure tight joints with the companion parts to be hereinafter referred to. This frame has a centrally-located inwardly-opening circumferential groove $a$, which forms a chamber for the water which passes through the filter bed or diaphragm D on its way to the outlet $b$, which leads to the filtered-water vessel. At the upper portion of the annular groove is a vent $c$ for the escape of confined air, which if allowed to remain within the frame might tend to make the filter "air-bound." In addition to the annular groove $a$ the frame is formed with two outwardly-facing annular channels $d$, formed between two flanges $e\ e'$, one, $e$, surrounding the perimeter of the frame and the other, $e'$, surrounding and forming an outstanding wall of the open center of the frame. Each of the inner flanges $e'$ has telescopically fitted over it the rim or annular ring or band $f$ of a foraminous cap B, which accurately fits the flange and is held thereto by frictional contact, said ring or band having an outturned flange $g$ at the inner edge adapted to rest flatwise upon the bottom of the annular groove or channel $d$.

The foraminous cap B serves as the support for the filter-bed, which bed I prefer to make in the form of a disk or pad of asbestos subjected to greater pressure at the central portion than at the edges, so as to leave a relatively soft pliable edge, as more fully explained in a companion application, Serial No. 146,123, filed by me of even date herewith. The pad or diaphragm D is placed upon the cap or support B and bears such relation to the same that the soft pliable edge represents the portion of pad which will project beyond the band or ring $f$ of the cap and which portion is to be turned into the groove or channel $d$ and to be so tightly compressed against the outer wall of the band or ring $f$ as to preclude the possibility of leakage of unfiltered water through the joint thus made. The filter-pad being placed in position over the cap B with its edge extending beyond the plane of the sides of the ring or band $f$, I next secure the pad or diaphragm in position by means of an outer ring or band E, which I will hereinafter designate as a "setter," as its principal object is to "set" the pad or diaphragm in its proper and accurate position in the filter. The ring or band may form a member of substantially a foraminous cap of the character of the cap B, through the perforations of which the unfiltered water reaches the asbestos pad or diaphragm and is filtered in passing through the same, or said band may simply be in the form of an open-center ring E', as shown in Fig. 3, having an inwardly-turned flange to extend over the angle formed by bending the edge of the pad or diaphragm into the groove of the frame A. In either case the diameter of the cap or setter E and also the ring E' is somewhat greater than the cap B, so that when the setter or ring is placed telescopically over the pad or diaphragm its edge 10 forces the edge portion of the pad or diaphragm into the groove or channel $d$ to the bottom thereof and tightly circumferentially clamps the inturned portion of said edge between the inner wall 12 of the setter or ring and the outer wall 13 of the flange e' of the frame, and thereby makes a water-tight joint at this point.

When the setter or ring is first brought into contact with the pad or diaphragm lying upon the support or inner cap, its edge depresses the pad into the groove or channel d to make the aforesaid joint, and the edge of the pad will project slightly above the frame and may be then turned into the groove to pack the latter by simply running the finger around said edge, thus sealing the joint and completing the filter. It will be understood that both sides of the filter are alike and that each side includes the arrangement of caps, setter, and pad as just described.

The filter as now described may be set into a vessel of unfiltered water, as in Fig. 4, its outlet-tube F being passed through an opening in the bottom of the vessel and being threaded to receive a nut 15 and washer 16, whereby it may be secured in vertical position in the unfiltered-water vessel and the water caused to pass laterally through the pads or diaphragms and be discharged as a filtered product through said outlet F. The discharge may be into a second bucket, pitcher, tank, or other vessel designed to receive the filtered water. Instead of being fixed in position as just described the filter may be simply placed in a tank, bucket, or other vessel and may have its outlet connected to a flexible or other tube 20, in which event the passage of water through the filter is induced by a siphon action, as illustrated in Fig. 5, or said tube 20 may be held in the mouth and the filter placed in the water of a stream and the water sucked through the filter, as illustrated in Fig. 6.

In either case the passage of the water through the pads or diaphragms causes the latter to take up the suspended impurities and leave the final product a wholesome purified liquid.

Having thus described my invention, what I claim as new, and desire to secure by Letters Patent, is—

1. In a filter the combination of a frame having two outstanding flanges on its side, a foraminous pad-supporting member fitted to one of said flanges, a fibrous pad or diaphragm of greater diameter than the supporting member and of such diameter that it normally extends across the channel or groove formed between said flanges, and a member including a clamping ring or band telescopically fitting the pad or diaphragm and adapted to turn the edge of the latter into said groove or channel and form a water-tight circumferential joint between the adjacent parallel walls of the supporting member and ring or band.

2. In a filter, an open-center frame having substantially parallel flanges forming between them a groove or channel and foraminous plates or supports carried by one of said flanges and fitting said open center, in combination with a fibrous pad or diaphragm upon said support and having its edge normally projecting beyond the edge of said support and over said groove or channel, and a foraminous cap-shaped member adapted to fit over the pad or diaphragm and position the same on the support and turn the normally straight edge of the pad at substantially right angles into said groove or channel and parallel with the adjacent walls of the cap-shaped member and said plate or support, whereby the pad is substantially stretched and tightened and its edge circumferentially clamped between the opposing surfaces to form a water-tight joint, and a means for frictionally holding the cap-shaped member in place.

3. In a filter the combination of an open-center frame having an outstanding flange surrounding the opening and a second flange spaced from the first-named flange to form an intermediate groove or channel; a foraminous cap having an inturned band or ring to fit over said first-named flange; a fibrous pad or diaphragm fitting over the foraminous cap and having such diameter that its edge normally projects beyond the perimeter of the band or ring and over said groove or channel; and an exterior member including a band or ring of greater diameter than the first-named cap and adapted to engage the portion of the pad over said groove or channel to "set" the pad or diaphragm and turn its edge into said groove or channel and clamp the inturned portion between the adjacent concentric walls of the cap and band or ring.

4. In a filter an open-center frame having an internal channel for filtered water, and having two parallel outstanding flanges on each of its sides; foraminous caps each having an inturned flange to fit over and frictionally engage one of the innermost of the first-named flanges; a fibrous filter pad or diaphragm covering the outer face of each of the said caps and having its edge normally projecting beyond the perimeter thereof; and exterior foraminous caps each having an inwardly-extending circumferential flange to engage the projecting edge of the pad or diaphragm and turn the same into the groove or channel formed between said parallel flanges of the main frame whereby a portion of the edge of the pad or channel is clamped between the concentric opposing walls of the inner and outer caps and a remaining outside portion is packed into the groove between the outer wall of the outside cap and the inner wall of the outermost flange of the main frame, said frame having a discharge-tube for filtered water.

5. A filter including an annular grooved frame having an open center; inner and outer telescopically-fitting, foraminous caps, said inner cap frictionally fitted to the open center of the frame; and a fibrous pad or diaphragm between adjacent faces of the caps and circumferentially clamped between the telescopically-fitting portions thereof and having its outer edge packed into a groove or channel between the outer wall of the outer cap and the inner wall of a flange on the main frame, said main frame having a discharge-tube for filtered water.

6. In a filter, the combination of an annular open-center frame having substantially parallel inner and outer outstanding flanges on its opposite sides forming intermediate grooves or channels, said frame having an interior water-passage and a threaded discharge-tube whereby it may be fitted to and held vertically in a vessel or tank; inner and outer caps at each side of the frame said outer caps of such diameter that they are adapted to occupy central positions in said grooves or channels; and fibrous pads over the inner caps and of such diameter that they extend across said grooves or channels so that their outer edge portions may be engaged by the outer caps and forced into the grooves or channels, and be circumferentially clamped between the caps and the outer flange of the frame.

In testimony whereof I have hereunto set my hand in presence of two subscribing witnesses.

EDWARD M. KNIGHT.

Witnesses:
  WALTER J. SKERTEN,
  GEO. J. B. FRANKLIN.